United States Patent [19]

Urban et al.

[11] Patent Number: 5,269,617
[45] Date of Patent: Dec. 14, 1993

[54] DEVICE FOR FLOATINGLY MOUNTING A SHAFT

[76] Inventors: Benoit Urban, 4, route de Bischwiller, 67240 Oberhoffen S/Mod er; Jean-Marc Hubsch, 35, rue Hirschfeld, 67610 La Wanzenau; Pierre Stephan, 5, rue Camille See, 68000 Colmar, all of France

[21] Appl. No.: 612,841

[22] Filed: Nov. 14, 1990

[30] Foreign Application Priority Data

Nov. 14, 1989 [FR] France ................. 89 15079

[51] Int. Cl.⁵ ............................................. F16B 7/00
[52] U.S. Cl. ........................................ 403/50; 403/291
[58] Field of Search ............... 403/50, 51, 288, 291; 277/212 FB; 74/18.1, 18

[56] References Cited

U.S. PATENT DOCUMENTS

| 3,365,252 | 1/1968 | Hettich. | |
|---|---|---|---|
| 3,468,171 | 9/1969 | Macielinski | 403/50 |
| 3,807,195 | 4/1974 | Faulbecker | 277/212 FB X |
| 4,345,772 | 8/1982 | Woody et al. | 403/50 X |
| 4,369,979 | 1/1983 | Krude et al. | 403/50 X |
| 4,403,781 | 9/1983 | Riemscheid | 277/212 FB |
| 4,543,069 | 9/1985 | Kobayashi | 277/212 FB X |
| 4,747,805 | 5/1988 | Welschof et al. | 403/288 X |
| 4,840,386 | 6/1989 | Peitsmeier et al. | 403/51 X |
| 4,946,303 | 8/1990 | Sawicki | 277/212 FB X |
| 5,099,709 | 3/1992 | Berselli | 74/18 |

FOREIGN PATENT DOCUMENTS 2623850 6/1989 France.

Primary Examiner—Randolph A. Reese
Assistant Examiner—Anthony Knight
Attorney, Agent, or Firm—Young & Thompson

[57] ABSTRACT

An apparatus for floatingly mounting a shaft, includes a housing (2), a rigid casing (4) for receiving and rotatably supporting one end of the shaft (1), and an elastically deformable element (5) floatingly supporting the rigid casing (4) in the housing (2). The elastically deformable element (5) is a bellows of synthetic material, mounted at one of its ends by an annular portion (5,) of smaller diameter than the internal folds of the bellows, on an external seat (6) of the rigid casing (4) and at its other end, by an annular portion (5") of greater diameter than the external folds of the bellows, in an internal seat (7) of the housing (2).

2 Claims, 1 Drawing Sheet

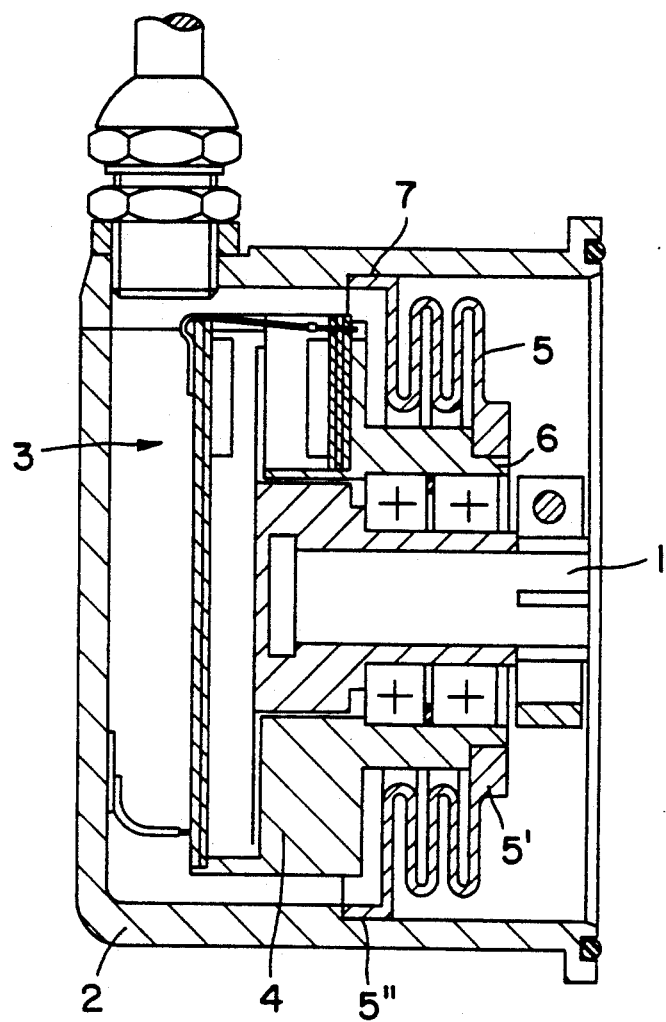

DEVICE FOR FLOATINGLY MOUNTING A SHAFT

The present invention relates to the field of mounting shafts having defects of axial alignment, and has for its object a floating mounting device for a shaft adapted to this end.

The invention will be better understood from the following description, which relates to a preferred embodiment, given by way of non-limiting example, and described with reference to the accompanying schematic drawing, whose single figure is a side elevational view in cross section of a device according to the invention.

The accompanying figure shows, by way of example, a shaft 1, hollow or solid, mounted floatingly in a housing 2 by means of a device 3.

According to the invention, this floating mounting device 3 of the shaft 1 is constituted essentially by a rigid casing 4 for receiving the shaft 1 and by an elastically deformable element 5 for mounting said rigid casing 4 in the housing 2.

The elastically deformable element 5 is preferably in the form of a bellows of synthetic material, preferably PTFE. This element 5 is mounted on the one hand at one of its ends by an annular portion 5' of smaller diameter than the internal folds of the bellows, on an external seat 6 of the rigid casing 4 and, on the other hand, at its other end, by an annular portion 5" of greater diameter than the external folds of the bellows, in an internal seat 7 of the housing 2.

The use of a synthetic material such as PTFE for the element 5 permits avoiding, in certain fields, the effect of an electric couple that might arise with the use of alloys such as nickel-chrome, PTFE having a completely neutral nature. Moreover, PTFE permits adapting to relatively great misalignments between the housing 2 of the recorder and the shaft 1.

Thanks to the invention, it is possible to provide a floating shaft mounting which tolerates large errors of axial, radial and/or angular alignment.

Moreover, the device according to the invention is equally applicable to solid or hollow shafts without requiring supplemental accessory devices.

Of course, the invention is not limited to the embodiment described and shown in the accompanying drawing. Modifications remain possible, particularly with regard to the construction of the various elements or by substitution of equivalent techniques, without thereby departing from the scope of protection of the invention.

What is claimed is:

1. An apparatus for floatingly mounting a shaft, comprising a housing (2), a rigid casing (4) for receiving and rotatably supporting one end of the shaft (1), and an elastically deformable element (5) floatingly supporting the rigid casing (4) and said one end of the shaft (1) in the housing (2), the elastically deformable element (5) comprising a bellows of synthetic material, said elastically deformable element (5) being mounted at one of its ends by an annular portion (5') of smaller diameter than the internal folds of the bellows, on an external seat (6) of the rigid casing (4) and at its other end, by an annular portion (5") of greater diameter than the external folds of the bellows, in an internal seat (7) of the housing (2), said rigid casing (4) having outer surface portions of two difference external diameters the smaller of which is cylindrical and extends endwise to an end of said rigid casing (4), there being an abutment shoulder between said two portions of different diameter, one end of said bellows being in abutment against said abutment shoulder and surrounding and in contact with said portion of smaller diameter.

2. An apparatus for floatingly mounting a shaft, comprising a housing (2), a rigid casing (4) for receiving and rotatably supporting one end of the shaft (1), and an elastically deformable element (5) floatingly supporting the rigid casing (4) and said one end of the shaft (1) in the housing (2), the elastically deformable element (5) comprising a bellows of synthetic material, said elastically deformable element (5) being mounted at one of its ends by an annular portion (5') of smaller diameter than the internal folds of the bellows, on an external seat (6) of the rigid casing (4) and at its other end, by an annular portion (5") of greater diameter than the external folds of the bellows, in an internal seat (7) of the housing (2), said housing having inner surface portions of larger and smaller diameters with an abutment shoulder therebetween, one end of said bellows being disposed entirely within said portion of larger diameter and abutting against said abutment shoulder, said portion of larger diameter being cylindrical from said abutment shoulder to an open end of said housing, said rigid casing (4) having outer surface portions of two different external diameters the smaller of which is cylindrical and extends endwise to an end of said rigid casing (4), there being an abutment shoulder between said two portions of different diameter, one end of said bellows being in abutment against said abutment shoulder and surrounding and in contact with said portion of smaller diameter.

* * * * *